(12) United States Patent
Lee

(10) Patent No.: US 9,229,198 B2
(45) Date of Patent: Jan. 5, 2016

(54) FIVE-PIECE LENS SET FOR CAPTURING IMAGES

(71) Applicant: ABILITY OPTO-ELECTRONICS TECHNOLOGY CO. LTD., Taichung (TW)

(72) Inventor: Hung-Wen Lee, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 0 days.

(21) Appl. No.: 14/588,522

(22) Filed: Jan. 2, 2015

(65) Prior Publication Data

US 2015/0205073 A1    Jul. 23, 2015

(30) Foreign Application Priority Data

Jan. 17, 2014   (TW) .............................. 103101821 A

(51) Int. Cl.
*G02B 3/02*    (2006.01)
*G02B 13/00*   (2006.01)
*G02B 9/60*    (2006.01)

(52) U.S. Cl.
CPC .............. *G02B 13/0045* (2013.01); *G02B 9/60* (2013.01)

(58) Field of Classification Search
CPC ............. G02B 13/18; G02B 3/04; G02B 9/60
USPC ................................................... 359/708, 714
See application file for complete search history.

(56) References Cited

U.S. PATENT DOCUMENTS 8,508,836 B2 *   8/2013   Ohtsu ........................... 348/340

* cited by examiner

*Primary Examiner* — James Greece
(74) *Attorney, Agent, or Firm* — Muncy, Geissler, Olds & Lowe, P.C.

(57) ABSTRACT

The invention discloses a five-piece lens set for capturing images. The lens set comprises a five-piece optical lens. In order from an object side toward an image side, the five-piece optical lens comprises a first lens element with positive refractive power having a convex image-side surface; a second lens element having a convex object-side surface, and at least one of both surfaces thereof being aspheric; a third lens element with positive refractive power having a concave image-side surface, and having one inflection point that is located away from the optical axis; a fourth lens element with positive refractive power, and at least one of both surfaces thereof being aspheric; a fifth lens element having a convex object-side surface and having two inflection points not closed to an optical axis on the object-side surface. The five-piece lens set further comprises an aperture stop and an image-plane.

15 Claims, 13 Drawing Sheets

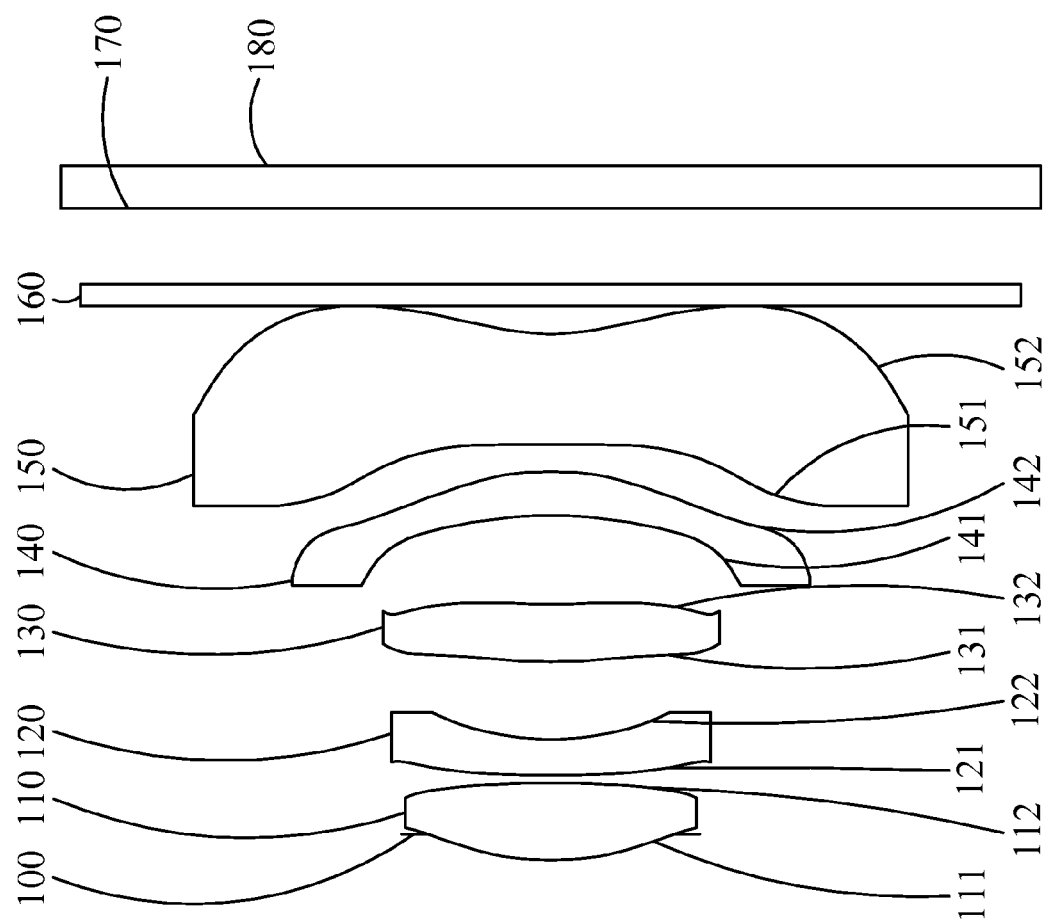

FIVE-PIECE LENS SET FOR CAPTURING IMAGES

CROSS-REFERENCE TO RELATED APPLICATION

This application claims priority from Taiwan Patent Application No. 103101821, filed on Jan. 17, 2014, in the Taiwan Intellectual Property Office, the content of which are hereby incorporated by reference in their entirety for all purposes.

BACKGROUND OF THE INVENTION

1. Field of the Invention

The following description relates to a five-piece lens set for capturing images, and more particularly to a miniaturized optical lens set that can be applied to electronic products.

2. Description of the Related Art

Presently, as the electronic products with images capturing is burgeoning, the needs for the miniaturized photograph lens increase gradually. The designs of two-piece, three-piece, four-piece and five-piece lens are known, but in terms of the image quality, the four-piece and five-piece lens have an advantage over the aberration correction and optical transfer function, wherein the high definition of the five-piece lens enables the functions fitting into the electronic products with high quality and high pixel.

As for as the smaller digital camera, webcam, lens of mobile phone and so on are concerned, the optical lens thereof is requested to be miniaturized, shorter focal length, and better aberration adjustment; as to the five-piece lens set for capturing image with stationary focal length, the four-piece and five-piece lens with different refractive powers as well as inflection point match up the demands for better aberration correction and shorter total length.

As a result, how to reduce the total length of optical lens for capturing image and effectively combine sets of lenses so as to further promote the imaging quality by means of a five-piece lens with refractive power, convex and concave surfaces has become an extremely crucial issue.

SUMMARY OF THE INVENTION

The aspect of embodiment of the present disclosure aims to a five-piece lens set for capturing image which uses combination of refractive power, convex and concave surfaces of the five-piece lens set to further shorten total length of the five-piece lens set for capturing image so as to increase imaging quality and be applied to the minimized electronic products.

According to the aforementioned purpose, the present disclosure may provide a five-piece lens set for capturing images including a five-piece lens, in order from an object side toward an image side including a first lens element with positive refractive power having a convex image-side surface near the optical axis; a second lens element having a convex object-side surface near the optical axis, and at least one of the object-side and an image-side surfaces of the second lens element being aspheric; a third lens element with positive refractive power having a concave image-side surface, and having one inflection point that may be located away from the optical axis; a fourth lens element with positive refractive power, and at least one of an image-side and an object-side surfaces of the fourth lens element being aspheric; a fifth lens element having a convex object-side surface near the optical axis and the object-side surface having two inflection points that may be located away from the optical axis; an image-plane for imaging an object to be imaged; and an aperture stop disposed between the object and the second lens element; wherein a distance from the object-side surface of the first lens element to the image-plane on the optical axis may be TL, a distance from the image-plane nearest the image-side surface of the fifth lens element to the optical axis may be Ysagm, a central thickness of the fifth lens element may be ct5, a curvature radius of the object-side surface of the first lens element near the optical axis may be R1, a height from a second inflection point of the object-side surface of the fifth lens element to the optical axis may be Yift2, the second inflection point may be one of which is farther than the optical axis, a distance from the center of the object-side surface of the fifth lens element and the second inflection point perpendicular to a point of the optical axis may be Sag, and the following relationship may be satisfied: $2.5<TL/Ysagm<5.0$, $0.1<ct5/R1<0.8$, $4.0<Yift2/Sag<20.0$.

Preferably, the image-plane may be positioned on an image sensor.

Preferably, an Abbe number of the second lens element may be vd2, and the following relationship may be satisfied: $vd2 \leq 30$.

Preferably, Ysagm and Yift2 may be satisfied with the following relationship: $0.5<Yift2/Ysagm<1.3$.

Preferably, the third, fourth and fifth lens elements may be all made of plastic material.

According to the aforementioned purpose, the present disclosure may further provide a five-piece lens set for capturing images, including: a five-piece optical lens, in order from an object side toward an image side including a first lens element with positive refractive power having a convex image-side surface near the optical axis; a second lens element having a convex object-side surface near the optical axis, and at least one of the object-side and an image-side surfaces of the second lens element being aspheric; a third lens element with positive refractive power having a convex object-side surface and a concave image-side surface near the optical axis; a fourth lens element having a concave object-side surface near the optical axis; a fifth lens element with negative refractive power having a convex object-side surface near the optical axis and the object-side surface having two inflection points that may be located away from the optical axis; an image-plane for imaging an object to be imaged; and an aperture stop disposed between the object and the second lens element; wherein a distance from the object-side surface of the first lens element to the image-plane on the optical axis may be TL, a distance from the image-side surface of the first lens element to the object-side surface of the second lens element on the optical axis may be T12, a distance from the image-plane nearest the image-side surface of the fifth lens element to the optical axis may be Ysagm, a central thickness of the fourth lens element may be ct4, a height from a second inflection point of the object-side surface of the fifth lens element to the optical axis may be Yift2, the second inflection point may be one of which is farther than the optical axis, a distance from the center of the object-side surface of the fifth lens element and the second inflection point perpendicular to a point of the optical axis may be Sag, and the following relationship may be satisfied: $2.5<TL/Ysagm<5.0$, $0.05<T12/ct4<0.35$, $4.0<Yift2/Sag<20.0$.

Preferably, the image-plane may be positioned on an image sensor.

Preferably, an Abbe number of the first lens element may be vd1, an Abbe number of the second lens element may be vd2, and the following relationship may be satisfied: $25 \leq vd1 - vd2 \leq 35$.

Preferably, a curvature radius of the object-side surface of the first lens element near the optical axis may be R1, a central thickness of the third lens element may be ct3, and the following relationship may be satisfied: 3.5<R1/ct3<6.0.

Preferably, the fourth and the fifth lens elements may be made of plastic material, and the image-side surface of the fourth lens element may have at least one inflection point.

According to the aforementioned purpose, the present disclosure may further provide a five-piece lens set for capturing images, including: an aperture stop; a five-piece optical lens, in order from an object side toward an image side including a first lens element with positive refractive power having a convex image-side surface near the optical axis; a second lens element with negative refractive power having a convex object-side surface and a concave image-side surface near the optical axis; a third lens element with positive refractive power having a concave image-side surface near the optical axis and having one inflection point that may be located away from the optical axis; a fourth lens element with positive refractive power having at least one inflection point in the image-side surface; a fifth lens element having a convex object-side surface and a concave image-side surface near the optical axis, and the object-side surface having two inflection points that may be located away from the optical axis; an image-plane for imaging an object to be imaged; and an aperture stop disposed between the object and the second lens element; wherein a distance from the object-side surface of the first lens element to the image-plane on the optical axis may be TL, a distance from the image-side surface of the fourth lens element to the object-side surface of the fifth lens element on the optical axis may be T45, a distance from the image-plane nearest the image-side surface of the fifth lens element to the optical axis may be Ysagm, a central thickness of the fifth lens element may be ct5, a height from a second inflection point of the object-side of the fifth lens element to the optical axis may be Yift2, the second inflection point may be one of which is farther than the optical axis, a distance from the center of the object-side surface of the fifth lens element and the second inflection point perpendicular to a point of the optical axis may be Sag, and the following relationship may be satisfied: 2.5<TL/Ysagm<5., 2.0<ct5/T45<8.0, 4.0<Yift2/Sag<20.0.

Preferably, the image-plane may be positioned on an image sensor.

Preferably, a focal length of the five-piece optical lens may be f, and the following relationship may be satisfied: 0.1≤ct5/f≤0.3.

Preferably, a distance from the image-side surface of the first lens element to the object-side surface of the second lens element on the optical axis may be T12, and the following relationship may be satisfied: 1.7<T45/T12<4.5.

Preferably, the object-side and the image-side surfaces of the second lens element may be aspheric, the fifth lens element may be made of plastic material and the object-side and the image-side surfaces of the fifth lens element may be aspheric.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein:

FIG. 4A is a schematic diagram of the third embodiment of a five-piece lens set for capturing images according to the present invention.

DETAILED DESCRIPTION OF THE PREFERRED EMBODIMENTS

As used herein, the term "and/or" includes any and all combinations of one or more of the associated listed items. Expressions such as "at least one of," when preceding a list of elements, modify the entire list of elements and do not modify the individual elements of the list.

Figure 1:
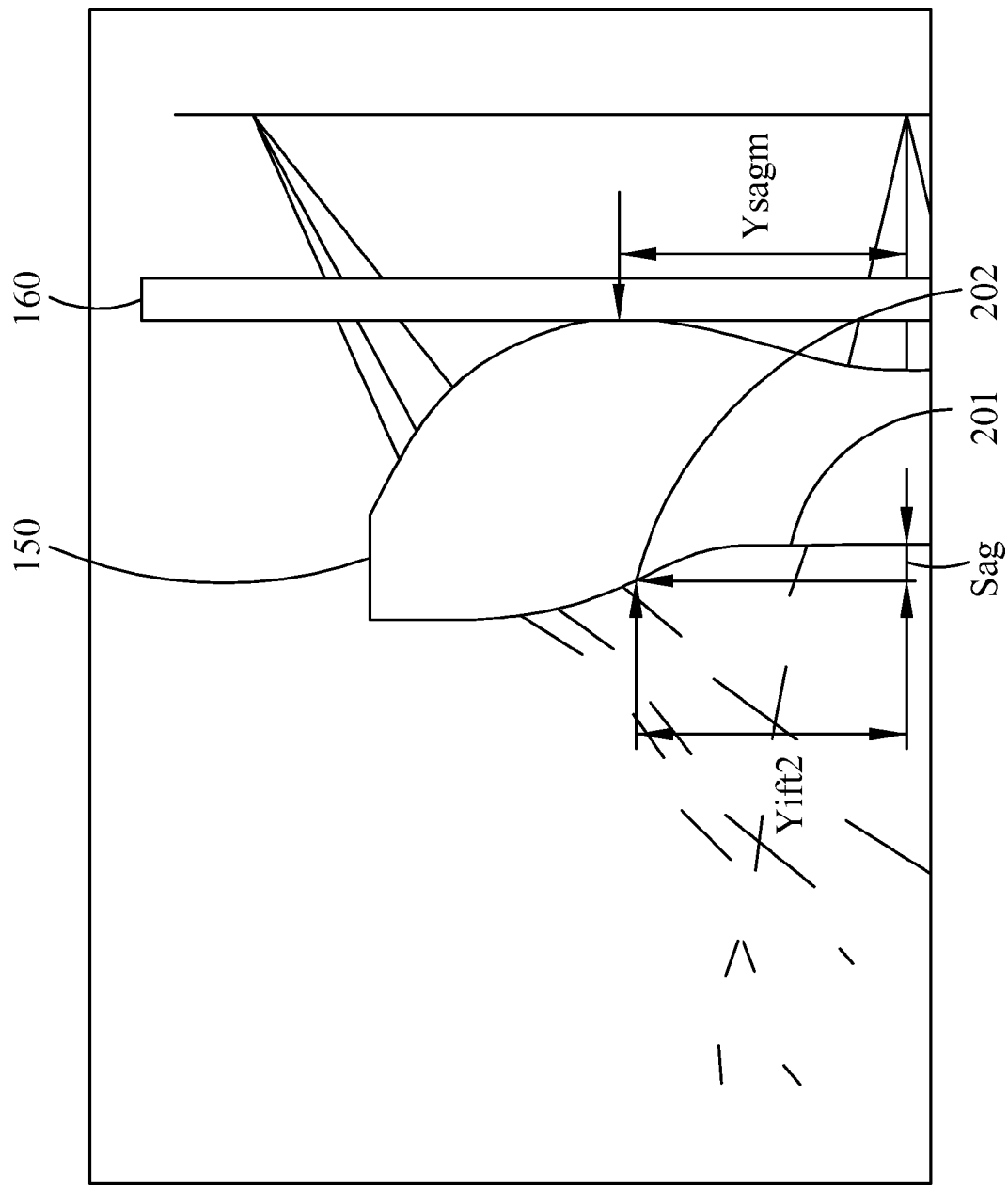
FIG. 1 is a schematic diagram of related parameter of a five-piece lens set for capturing images according to the present invention.

Please refer to FIG. 1 which is a schematic diagram of related parameter of a five-piece lens set for capturing images according to the present invention. As FIG. 1 shows, an object-side surface of the five-piece lens 150 includes a first 201 and a second 202 inflection points, and the second inflection point 202 is one of which is farther than the optical axis; an IR filter 160 is between an image-plane and the fifth lens element 150, a height from the second inflection point 202 to the optical axis is Yift2, a distance from the center of the object-side surface 152 of the fifth lens element 150 and the second inflection point 202 perpendicular to a point of the optical axis is Sag, and a distance from the image-plane nearest the object-side surface to the optical axis is Ysagm. The application of Yift2, Sag and Ysagm will be described in the following embodiments. Therefore, FIG. 1 is used to explain herein.

Figure 2A:
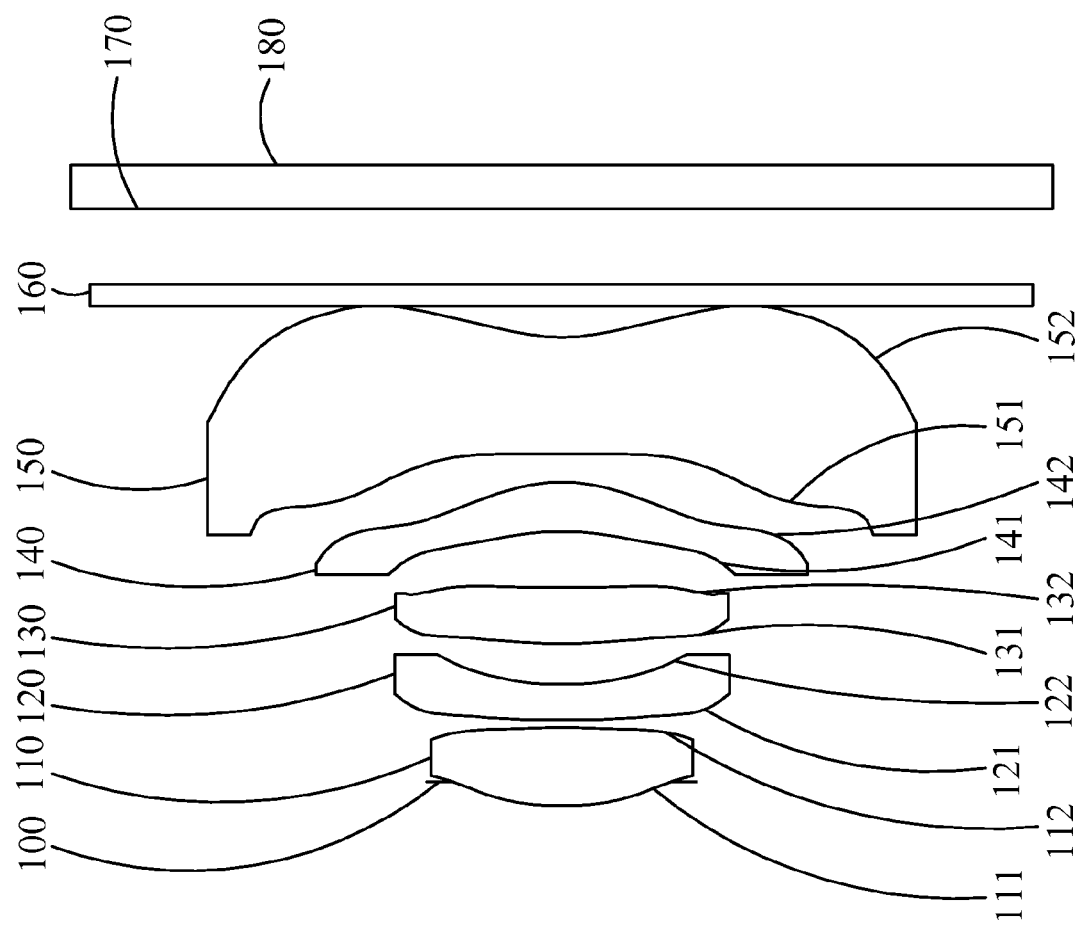
FIG. 2A is a schematic diagram of the first embodiment of a five-piece lens set for capturing images according to the present invention.

Please refer to FIG. 2A which is a schematic diagram of the first embodiment of a five-piece lens set for capturing images according to the present invention. As FIG. 2A shows, the present disclosure includes a five-piece lens set for capturing images including a five-piece optical lens, in order from an object side toward an image side including a first 110, a second 120, a third 130, a fourth 140 and a fifth 150 lens elements.

The first lens element 110 with positive refractive power has a convex image-side surface 112. The first embodiment uses the second lens element 120 with negative refractive power having a concave image-side surface 122 and a convex object-side surface 121 and both surfaces thereof being aspheric as example, but it shall not subject to this restriction; it is able to apply the second lens element 120 without negative refractive power or the image-side surface 122 of the second lens element not being concave, too. The aspheric surface used in the present disclosure can be used as shape of spherical surface to acquire more controllable variations to reduce the aberration so as to shorten the using amount of the lens as well as the total length of the lens effectively.

The first embodiment uses the third lens element 130 with positive refractive power having a convex object-side surface 131, a concave image-side surface 132 and having one inflection point that is located away from the optical axis as example, but it shall not subject to this restriction; it is able to apply the third lens element 130 without a convex object-side surface 131 or without having one inflection point in the image-side surface 132 that is located away from the optical axis, too.

The first embodiment uses an image-side surface 142 of the forth lens being aspheric and having a concave object-side surface 141; the fourth lens element 140 with positive refractive power having an image-side surface 142 and the image-side surface 142 having at least one inflection point as example, but it shall not subject to this restriction; it is able to apply the object-side surface 141 not being concave, not having positive refractive power, not being aspheric or both the object-side surface 141 and the image-side surface 142 of the fourth lens element not being aspheric, too.

The first embodiment uses the fifth lens element with negative refractive power having a convex object-side surface 151 and a concave image-side surface 152 and having two inflection points not closed to the optical axis on the object-side surface as example, but it shall not subject to this restriction; it is able to apply the fifth lens element 150 not having the concave image-side surface 152 and not having negative refractive power, too.

The five-piece lens set for capturing images of the present disclosure further includes an aperture stop 100 and an IR filter 160. The aperture stop 100, which is disposed between the object and the first lens element 110 is served as a front aperture stop; the IR filter 160 is disposed between the fifth lens element 150 and the image-plane 170, and is normally made of plate optical material, and does not affect the focal length of the five-piece lens set for capturing images of the present disclosure.

The five-piece lens set for capturing images of the present disclosure further includes an image sensor 180 disposed on the image-plane 170 for imaging an object to be imaged. The first 110 and the second 120 lenses are made of plastic material or glass material, and the third 130, fourth 140 and fifth 150 lenses comprise a plastic material, but there is not restriction on whether the third 130 or fourth 140 lenses are plastic, and the usage of plastic material is able to reduce the weight of the five-piece lens set for capturing images as well as manufacture cost thereof, and the aspheric formula of the present disclosure is: $z=ch^2/[1+[1-(k+1)c^2h^2]^{0.5}]+Ah^4+Bh^6+Ch^8+Dh^{10}+Eh^{12}+Fh^{14}+Gh^{16}+Hh^{18}+Jh^{20}+\ldots$, wherein z is a position of altitude h along the optical axis of which surface vertex is served as reference positional value; k is a conic constant, c is count of curvature radius and A, B, C, D, E, F, G and H are high order aspheric coefficients.

The optical statistic of the first embodiment is shown in Table 1, wherein the all of the object-side and the image-side surfaces of the first 110 to the fifth 150 lens elements are consisted of the aspheric formulas (1), and the aspheric coefficients are shown in Table 2, wherein a focal length of five-piece optical lens for capturing images is f=3.294 mm, a distance from the image-plane nearest the image-side surface of the fifth lens element to the optical axis is Ysagm=1.236 mm, a central thickness of the third lens element is ct3=0.364 mm, a central thickness of the fourth lens element is ct4=0.327 mm, a central thickness of the fifth lens element is ct5=0.766 mm, a curvature radius of the object-side surface of the first lens element near the optical axis is R1=1.551 mm, a height from a second inflection point of the object-side surface of the fifth lens element to the optical axis is Yift2=1.060 mm, the second inflection point is one of which is farther than the optical axis in the fifth lens element 150, a distance from the center of the object-side surface 152 of the fifth lens element 150 and the second inflection point 202 perpendicular to a point of the optical axis is Sag=0.142 mm, a distance from the object-side surface of the first lens element to the image-plane on the optical axis is TL=4.00 mm, a distance from the image-side surface of the first lens element to the object-side optical of the second lens element is T12=0.05 mm and a distance from the image-side surface of the fourth lens element to the object-side optical of the fifth lens element is T45=0.182 mm; TL/Ysagm=3.236, ct5/R1=0.494, Yift2/Sag=7.465, Yift/Ysagm=0.858, T12/ct4=0.153, vd1−vd2=32.2, R1/ct3=4.264, ct5/T45=4.209, ct5/f=0.233 and T45/T12=3.629.

TABLE 1

Basic lens element data of the first embodiment
Basic lens element data of the first embodiment

|  | Surface# | Curvature radius (mm) | Thickness (mm) | Index (Nd) | Abbe# (Vd) |
|---|---|---|---|---|---|
|  | Aperture Stop | ∞ | −0.168 |  |  |
| First lens element | First Surface | 1.551 | 0.512 | 1.544 | 56.09 |
|  | Second Surface | −6.859 | 0.050 |  |  |
| Second lens element | Third Surface | 10.000 | 0.232 | 1.636 | 23.89 |
|  | Fourth Surface | 1.790 | 0.268 |  |  |
| Third lens element | Fifth Surface | 3.399 | 0.364 | 1.544 | 56.09 |
|  | Sixth Surface | 10.000 | 0.365 |  |  |
| Fourth lens element | Seventh Surface | −1.786 | 0.327 | 1.544 | 56.09 |
|  | Eighth Surface | −1.017 | 0.182 |  |  |
| Fifth lens element | Ninth Surface | 10.000 | 0.766 | 1.515 | 57.18 |
|  | Tenth Surface | 1.159 | 0.204 |  |  |
| IR-Filter | Eleventh Surface | ∞ | 0.15 | 1.517 | 64.17 |
|  | Twelfth Surface | ∞ | 0.58 |  |  |

TABLE 2

Aspheric coefficients of the first embodiment

| | Surface# | | | | |
|---|---|---|---|---|---|
| | 1 | 2 | 3 | 4 | 5 |
| k | 0.608 | 31.255 | −1268.560 | −14.700 | −4.425 |
| A | −0.0497 | 0.0841 | 0.1234 | 0.1724 | −0.1482 |
| B | −0.0188 | −0.1329 | −0.0692 | 0.0148 | 0.0444 |
| C | −0.1184 | −0.0962 | −0.0959 | −0.0818 | −0.0195 |

TABLE 2-continued

Aspheric coefficients of the first embodiment

| | | | | | |
|---|---|---|---|---|---|
| D | 0.0472 | 0.0194 | −0.0233 | 0.0588 | 0.0433 |
| E | −0.0029 | −0.0150 | 0.2309 | 0.0621 | 0.0863 |
| F | −0.2176 | 0.0993 | 0.0431 | 0.0049 | 0.0160 |
| G | 0.0944 | −0.0467 | −0.1131 | −0.0380 | −0.0542 |
| H | 0.0000 | 0.0000 | 0.0000 | 0.0000 | 0.0000 |
| J | 0.0000 | 0.0000 | 0.0000 | 0.0000 | 0.0000 |

| | Surface# | | | | |
|---|---|---|---|---|---|
| | 6 | 7 | 8 | 9 | 10 |
| k | 43.722 | 1.270 | −1.231 | −833.845 | −8.025 |
| A | −0.0648 | 0.3159 | 0.2195 | −2.8656 | −3.7727 |
| B | −0.1039 | −0.1363 | −0.0262 | 7.3876 | 7.8996 |
| C | −0.0128 | 0.0121 | −0.0021 | −30.2993 | −12.0060 |
| D | 0.0216 | −0.0451 | −0.0033 | 91.7085 | −6.2420 |
| E | 0.0218 | 0.0119 | −0.0003 | −137.0666 | 50.6248 |
| F | 0.0159 | 0.0322 | 0.0005 | 97.4705 | −71.7144 |
| G | 0.0227 | −0.0122 | −0.0001 | −26.7740 | 33.8789 |
| H | 0.0000 | 0.0000 | 0.0000 | 0.0000 | 0.0000 |
| J | 0.0000 | 0.0000 | 0.0000 | 0.0000 | 0.0000 |

Figure 2B:
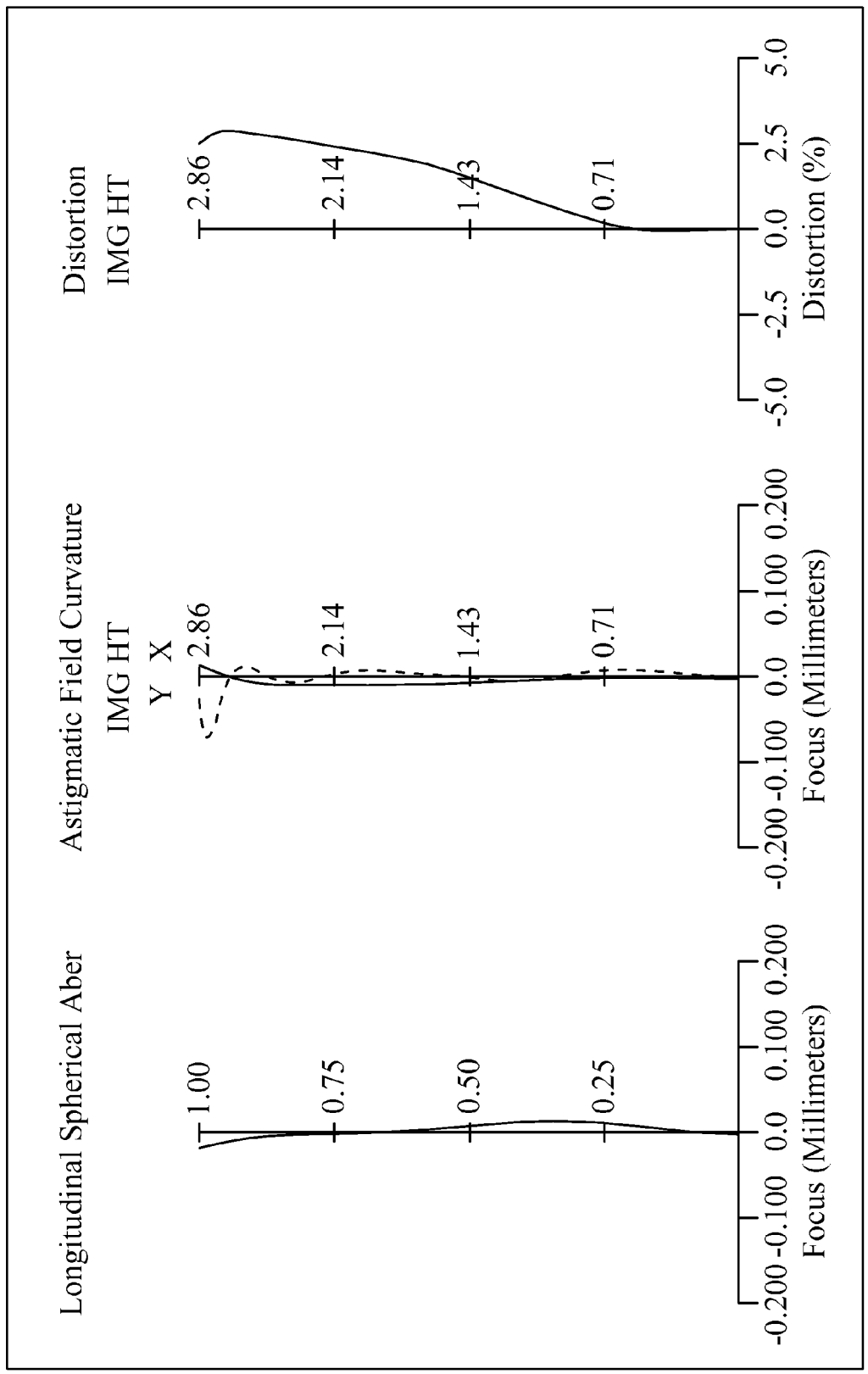
FIG. 2B is astigmatic field curves, a distortion curve and longitudinal spherical aberration curves of the first embodiment according to the present invention.

It can be found by the basic lens element data of table 1 along with the curve diagram of aberration of FIG. 2B that it has better compensation effect upon the astigmatic field curves, the distortion curves and the longitudinal spherical aberration curves by the embodiment of the five-piece lens set for capturing images according to the present disclosure.

Figure 3A:
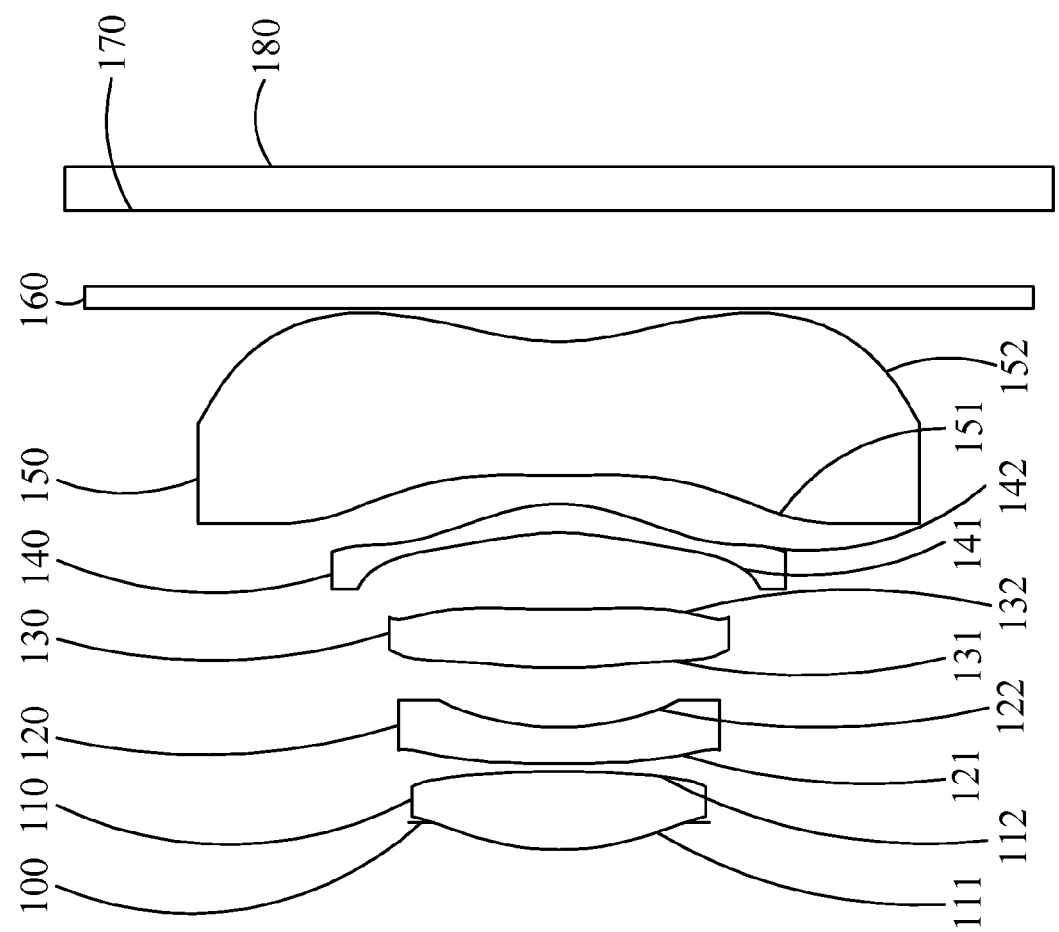
FIG. 3A is a schematic diagram of the second embodiment according to the present invention.

Please refer to FIG. 3A which is a schematic diagram of the second embodiment according to the present invention. As FIG. 3A shows, the lens structure of the second embodiment is akin to that of the first embodiment, and the difference is shown as the optical statistic of Table 3, wherein the all of the object-side and the image-side surfaces of the first 110 to the fifth 150 lens elements are consisted of the aspheric formulas (1), and the aspheric coefficients are shown in Table 4.

Wherein a focal length of five-piece optical lens for capturing images is f=3.598 mm, a distance from the image-plane nearest the image-side surface of the fifth lens element to the optical axis is Ysagm=1.308 mm, a central thickness of the third lens element is ct3=0.391 mm, a central thickness of the fourth lens element is ct4=0.190 mm, a central thickness of the fifth lens element is ct5=0.894 mm, a curvature radius of the object-side surface of the first lens element near the optical axis is R1=1.742, a height from a second inflection point of the object-side surface of the fifth lens element to the optical axis is Yift2=1.091 mm, the second inflection point is one of which is farther than the optical axis in the fifth lens element 150, a distance from the center of the object-side surface 152 of the fifth lens element 150 and the second inflection point 202 perpendicular to a point of the optical axis is Sag=0.129 mm, a distance from the object-side surface of the first lens element to the image-plane on the optical axis is TL=4.35 mm, a distance from the image-side surface of the first lens element to the object-side optical of the second lens element is T12=0.05 mm and a distance from the image-side surface of the fourth lens element to the object-side optical of the fifth lens element is T45=0.189 mm; TL/Ysagm=3.326, ct5/R1=0.513, Yift2/Sag=8.457, Yift/Ysagm=0.834, T12/ct4=0.263, vd1 −vd2=32.82, R1/ct3=4.460, ct5/T45=4.733, ct5/f=0.248 and T45/T12=3.776.

TABLE 3

Basic lens element data of the second embodiment
Basic lens element data of the second embodiment

| Surface# | | Curvature radius (mm) | Thickness (mm) | Index (Nd) | Abbe# (Vd) |
|---|---|---|---|---|---|
| Aperture Stop | | ∞ | −0.178 | | |
| First lens element | First Surface | 1.742 | 0.523 | 1.544 | 56.09 |
| | Second Surface | −4.199 | 0.050 | | |
| Second lens element | Third Surface | 8.469 | 0.241 | 1.640 | 23.27 |
| | Fourth Surface | 1.570 | 0.399 | | |
| Third lens element | Fifth Surface | 3.469 | 0.391 | 1.544 | 56.09 |
| | Sixth Surface | 10.000 | 0.506 | | |
| Fourth lens element | Seventh Surface | −1.733 | 0.190 | 1.544 | 56.09 |
| | Eighth Surface | −1.091 | 0.189 | | |
| Fifth lens element | Ninth Surface | 10.000 | 0.894 | 1.515 | 57.18 |
| | Tenth Surface | 1.460 | 0.224 | | |
| IR-Filter | Eleventh Surface | ∞ | 0.15 | 1.517 | 64.17 |
| | Twelfth Surface | ∞ | 0.60 | | |

TABLE 4

Aspheric coefficients of the second embodiment

| | Surface# | | | | |
|---|---|---|---|---|---|
| | 1 | 2 | 3 | 4 | 5 |
| k | 0.789 | 12.206 | −675.512 | −11.472 | −0.993 |
| A | −0.0439 | 0.1644 | 0.1096 | 0.1269 | −0.1416 |
| B | −0.0165 | −0.1121 | 0.0070 | 0.0282 | 0.0455 |
| C | −0.0661 | −0.0695 | −0.0738 | −0.0676 | −0.0426 |
| D | 0.0576 | 0.0623 | −0.0830 | 0.0355 | 0.0129 |
| E | −0.0042 | −0.0131 | 0.1528 | 0.0250 | 0.0752 |
| F | −0.1460 | 0.0409 | 0.0492 | 0.0049 | 0.0143 |
| G | 0.0944 | −0.0467 | −0.0978 | −0.0343 | −0.0347 |
| H | 0.0000 | 0.0000 | 0.0000 | 0.0000 | 0.0000 |
| J | 0.0000 | 0.0000 | 0.0000 | 0.0000 | 0.0000 |

| | Surface# | | | | |
|---|---|---|---|---|---|
| | 6 | 7 | 8 | 9 | 10 |
| k | 44.360 | 0.661 | −1.083 | −833.845 | −8.025 |
| A | −0.0909 | 0.3122 | 0.2338 | −1.9376 | −3.2808 |
| B | −0.0704 | −0.1539 | −0.0243 | 1.4694 | 6.5892 |
| C | −0.0044 | 0.0648 | −0.0061 | −5.6698 | −11.4874 |
| D | 0.0156 | −0.0461 | −0.0037 | 30.9522 | 4.1746 |
| E | 0.0128 | −0.0034 | 0.0004 | −54.9722 | 18.2671 |
| F | 0.0056 | 0.0262 | 0.0008 | 41.2043 | −30.6104 |
| G | 0.0087 | −0.0087 | −0.0002 | −11.4391 | 14.5038 |
| H | 0.0000 | 0.0000 | 0.0000 | 0.0000 | 0.0000 |
| J | 0.0000 | 0.0000 | 0.0000 | 0.0000 | 0.0000 |

Figure 3B:
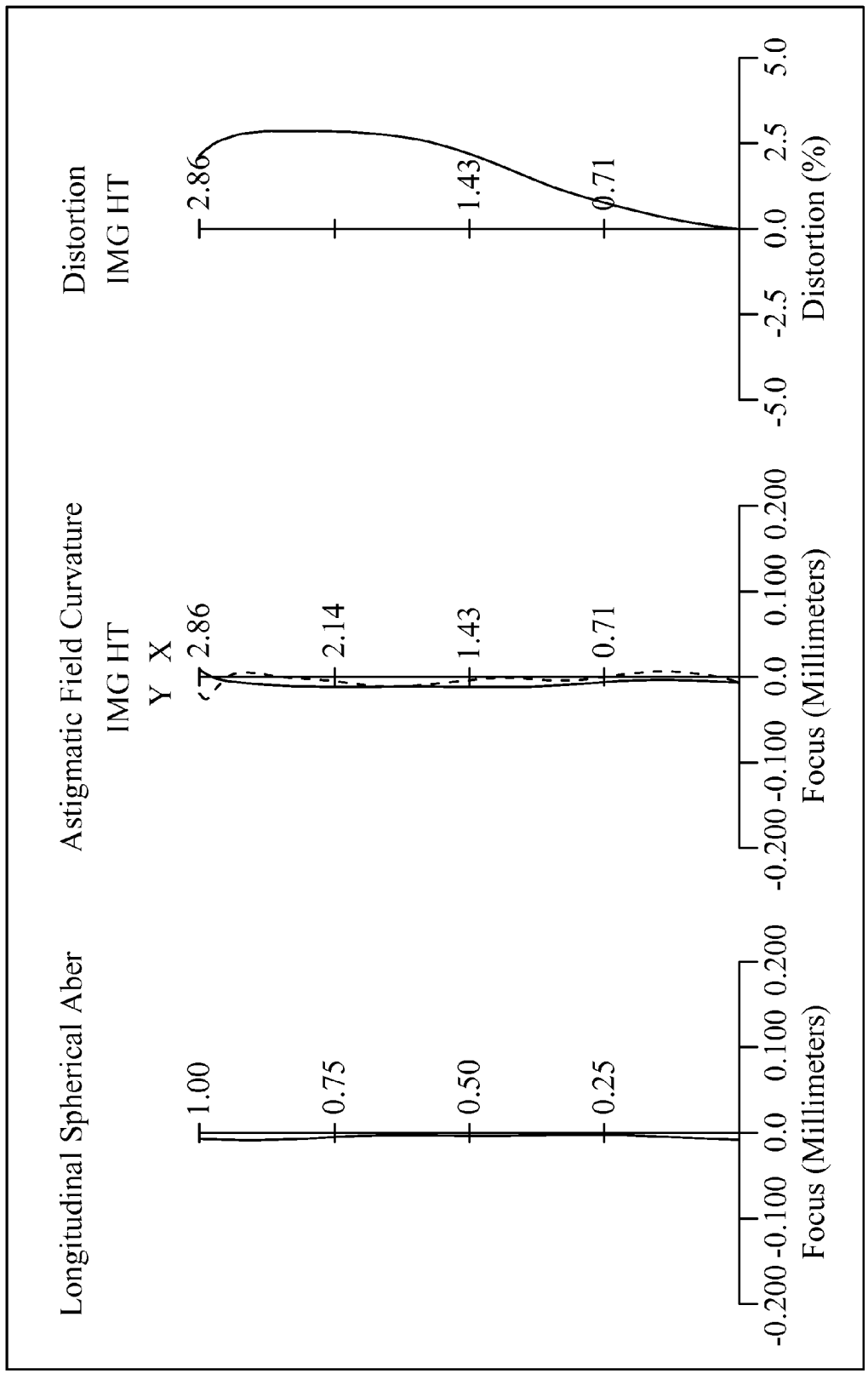
FIG. 3B is astigmatic field curves, a distortion curve and longitudinal spherical aberration curves of the second embodiment according to the present invention.

It can be found from the basic lens element data of table 3 along with the curve diagram of aberration of FIG. 3B that it has better compensation effect upon the astigmatic field curves, the distortion curves and the longitudinal spherical aberration curves by the embodiment of the five-piece lens set for capturing images according to the present disclosure.

Please refer to FIG. 4A which is a schematic diagram of the third embodiment according to the present invention. As FIG. 4A shows, the lens structure of the third embodiment is akin to that of the first embodiment, and the difference is shown as the optical statistic of Table 5, wherein the all of the object-side and the image-side surfaces of the first 110 to the fifth 150 lens elements are consisted of the aspheric formulas (1), and the aspheric coefficients are shown in Table 6.

Wherein a focal length of five-piece optical lens for capturing images is f=4.070 mm, a distance from the image-plane nearest the image-side surface of the fifth lens element to the optical axis is Ysagm=1.101 mm, a central thickness of the third lens element is ct3=0.348 mm, a central thickness of the fourth lens element is ct4=0.286 mm, a central thickness of the fifth lens element is ct5=0.753 mm, a curvature radius of the object-side surface of the first lens element near the optical axis is R1=1.634 mm, a height from a second inflection point of the object-side surface of the fifth lens element to the optical axis is Yift2=1.114 mm, the second inflection point is one of which is farther than the optical axis in the fifth lens element 150, a distance from the center of the object-side surface 152 of the fifth lens element 150 and the second inflection point 202 perpendicular to a point of the optical axis is Sag=0.181 mm, a distance from the object-side surface of the first lens element to the image-plane on the optical axis is TL=4.63 mm, a distance from the image-side surface of the first lens element to the object-side optical of the second lens element is T12=0.05 mm and a distance from the image-side surface of the fourth lens element to the object-side optical of the fifth lens element is T45=0.178 mm; TL/Ysagm=4.205, ct5/R1=0.461, Yift2/Sag=6.155, Yift/Ysagm=1.012, T12/ct4=0.177, vd1 −vd2=32.2, R1/ct3=4.695, ct5/T45=4.229, ct5/f=0.185 and T45/T12=3.523.

TABLE 5

Basic lens element data of the third embodiment
Basic lens element data of the third embodiment

| Surface# | | Curvature radius (mm) | Thickness (mm) | Index (Nd) | Abbe# (Vd) |
|---|---|---|---|---|---|
| Aperture Stop | | ∞ | −0.265 | | |
| First lens element | First Surface | 1.634 | 0.583 | 1.544 | 56.09 |
| | Second Surface | −5.391 | 0.051 | | |
| Second lens element | Third Surface | 10.000 | 0.237 | 1.636 | 23.89 |
| | Fourth Surface | 1.682 | 0.486 | | |
| Third lens element | Fifth Surface | 3.597 | 0.348 | 1.544 | 56.09 |
| | Sixth Surface | 10.000 | 0.589 | | |
| Fourth lens element | Seventh Surface | −2.324 | 0.286 | 1.544 | 56.09 |
| | Eighth Surface | −1.491 | 0.178 | | |
| Fifth lens element | Ninth Surface | 10.000 | 0.753 | 1.515 | 57.18 |
| | Tenth Surface | 1.576 | 0.140 | | |
| IR Filter | Eleventh Surface | ∞ | 0.21 | 1.517 | 64.17 |
| | Twelfth Surface | ∞ | 0.77 | | |

TABLE 6

Aspheric coefficients of the third embodiment

| | Surface# | | | | |
|---|---|---|---|---|---|
| | 1 | 2 | 3 | 4 | 5 |
| k | 0.702 | 11.142 | −1038.502 | −11.313 | 2.100 |
| A | −0.0320 | 0.1265 | 0.0610 | 0.0900 | −0.1337 |
| B | 0.0048 | −0.0444 | 0.0676 | 0.0599 | 0.0351 |

TABLE 6-continued

Aspheric coefficients of the third embodiment

| | 1 | 2 | 3 | 4 | 5 |
|---|---|---|---|---|---|
| C | −0.0758 | −0.0239 | −0.0271 | −0.0220 | −0.0200 |
| D | 0.0524 | 0.0352 | −0.0996 | −0.0025 | −0.0059 |
| E | 0.0627 | −0.0875 | 0.0643 | −0.0078 | 0.0615 |
| F | −0.1365 | 0.0363 | −0.0354 | 0.0049 | 0.0186 |
| G | 0.0491 | 0.0035 | 0.0241 | −0.0051 | −0.0268 |
| H | 0.0000 | 0.0000 | 0.0000 | 0.0000 | 0.0000 |
| J | 0.0000 | 0.0000 | 0.0000 | 0.0000 | 0.0000 |

| | Surface# | | | | |
|---|---|---|---|---|---|
| | 6 | 7 | 8 | 9 | 10 |
| k | 80.874 | 1.145 | −0.366 | −833.845 | −8.025 |
| A | −0.1008 | 0.1721 | 0.1334 | −3.1733 | −5.4510 |
| B | −0.0471 | −0.1818 | −0.0208 | 7.0130 | 18.6260 |
| C | 0.0086 | 0.1124 | 0.0007 | −20.7332 | −60.5726 |
| D | 0.0117 | −0.0620 | −0.0005 | 57.4175 | 127.2028 |
| E | −0.0005 | −0.0143 | 0.0015 | −84.1409 | −164.9087 |
| F | −0.0034 | 0.0249 | 0.0004 | 59.6037 | 116.1754 |
| G | 0.0165 | −0.0081 | −0.0003 | −16.5071 | −33.7583 |
| H | 0.0000 | 0.0000 | 0.0000 | 0.0000 | 0.0000 |
| J | 0.0000 | 0.0000 | 0.0000 | 0.0000 | 0.0000 |

Figure 4B:
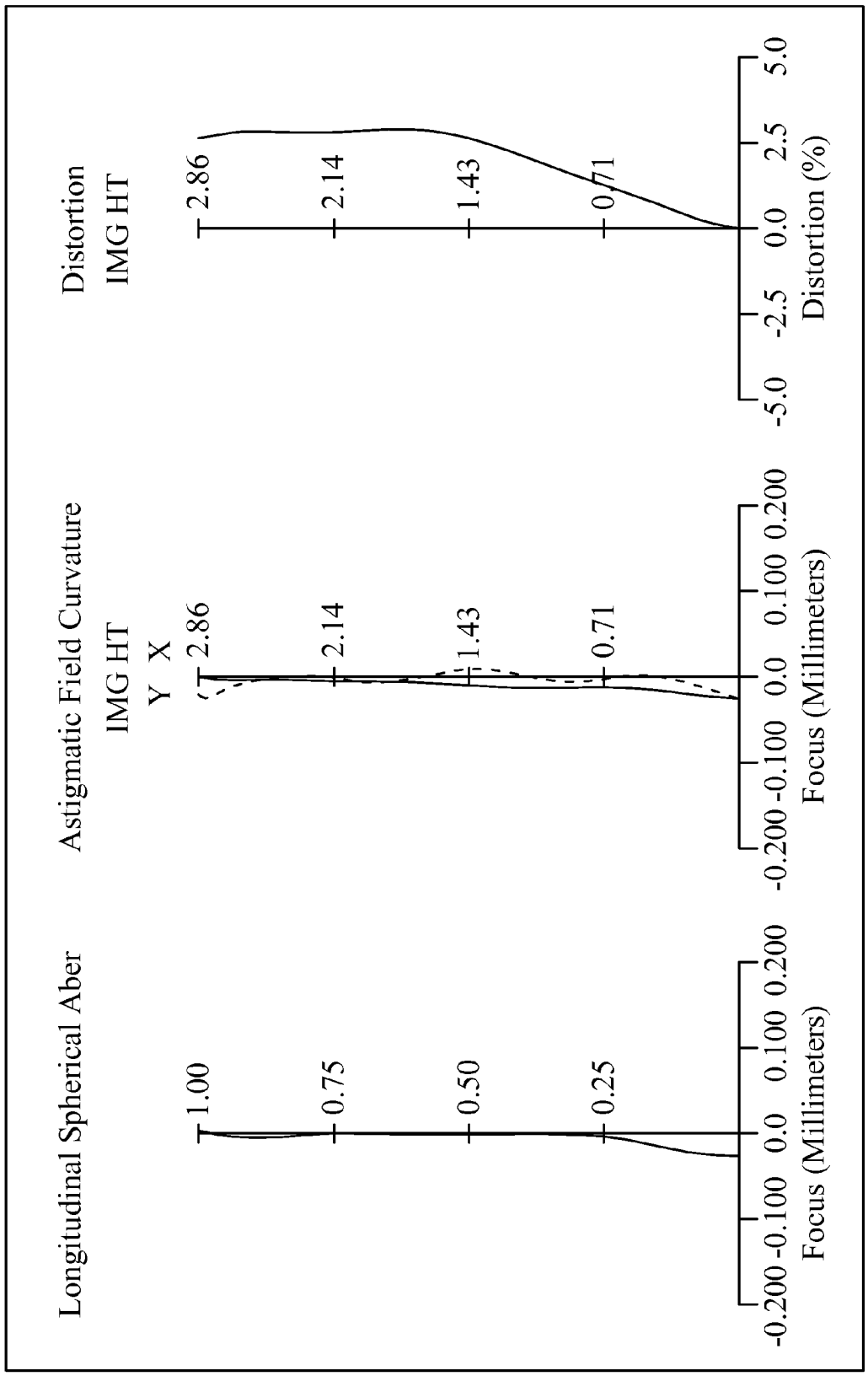
FIG. 4B is astigmatic field curves, a distortion curve and longitudinal spherical aberration curves of the third embodiment according to the present invention.

It can be found from the basic lens element data of table 5 along with the curve diagram of aberration of FIG. 4B that it has better compensation effect upon the astigmatic field curves, the distortion curves and the longitudinal spherical aberration curves by the embodiment of the five-piece lens set for capturing images according to the present disclosure.

Figure 5A:
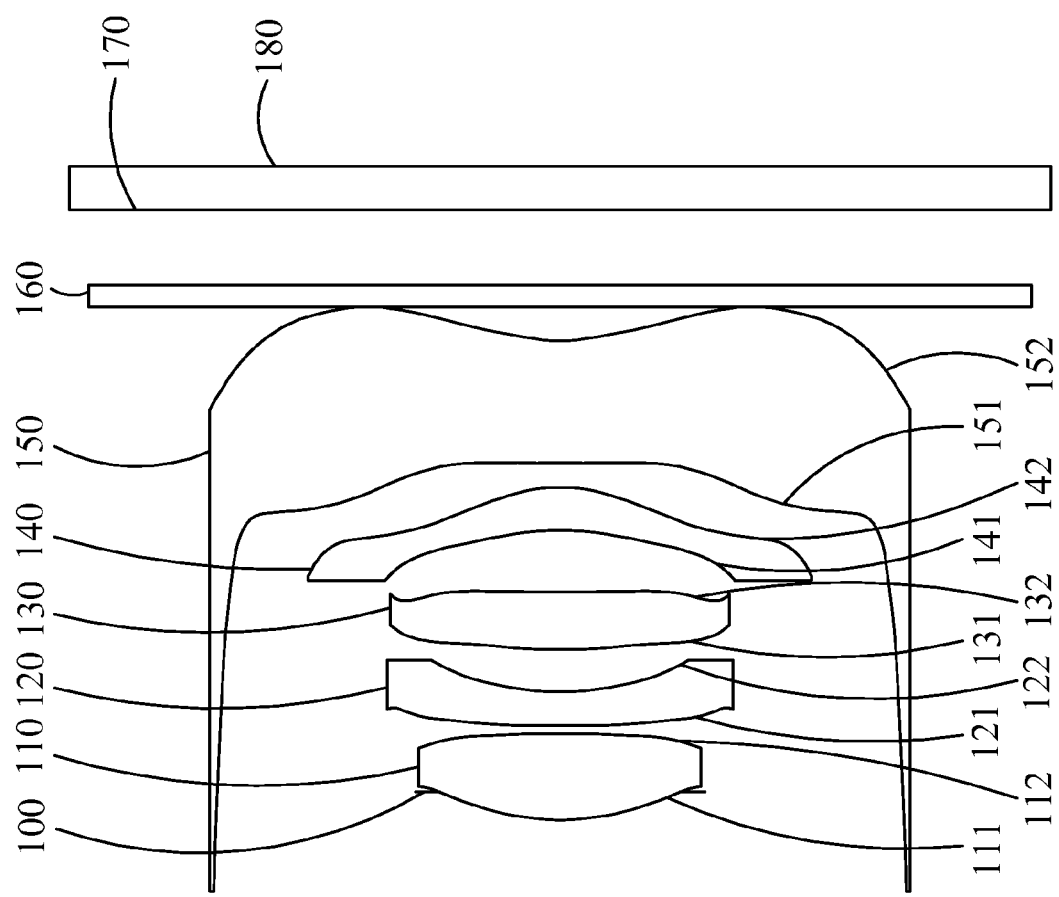
FIG. 5A is a schematic diagram of the fourth embodiment of a five-piece lens set for capturing images according to the present invention.

Please refer to FIG. 5A which is a schematic diagram of the fourth embodiment according to the present invention. As FIG. 5A shows, the lens structure of the fourth embodiment is akin to that of the first embodiment, and the difference is shown as the optical statistic of Table 7, wherein the all of the object-side and the image-side surfaces of the first 110 to the fifth 150 lens elements are consisted of the aspheric formulas (1), and the aspheric coefficients are shown in Table 8.

Wherein a focal length of five-piece optical lens for capturing images is f=3.300 mm, a distance from the image-plane nearest the image-side surface of the fifth lens element to the optical axis is Ysagm=1.290 mm, a central thickness of the third lens element is ct3=0.366 mm, a central thickness of the fourth lens element is ct4=0.275 mm, a central thickness of the fifth lens element is ct5=0.778 mm, a curvature radius of the object-side surface of the first lens element near the optical axis is R1=1.583 mm, a height from a second inflection point of the object-side surface of the fifth lens element to the optical axis is Yift2=0.966 mm, the second inflection point is one of which is farther than the optical axis in the fifth lens element 150, a distance from the center of the object-side surface 152 of the fifth lens element 150 and the second inflection point 202 perpendicular to a point of the optical axis is Sag=0.087 mm, a distance from the object-side surface of the first lens element to the image-plane on the optical axis is TL=4.00 mm, a distance from the image-side surface of the first lens element to the object-side optical of the second lens element is T12=0.05 mm and a distance from the image-side surface of the fourth lens element to the object-side optical of the fifth lens element is T45=0.158 mm; TL/Ysagm=3.101, ct5/R1=0.491, Yift2/Sag=11.103, Yift/Ysagm=0.749, T12/ct4=0.182, vd1 −vd2=32.2, R1/ct3=4.324, ct5/T45=4.911, ct5/f=0.236 and T45/T12=3.168.

TABLE 7

Basic lens element data of the fourth embodiment

| Surface# | | Curvature radius (mm) | Thickness (mm) | Index (Nd) | Abbe# (Vd) |
|---|---|---|---|---|---|
| Aperture Stop | | ∞ | −0.191 | | |
| First lens element | First Surface | 1.583 | 0.551 | 1.544 | 56.09 |
| | Second Surface | −6.542 | 0.050 | | |
| Second lens element | Third Surface | 10.000 | 0.220 | 1.636 | 23.89 |
| | Fourth Surface | 1.804 | 0.269 | | |
| Third lens element | Fifth Surface | 3.332 | 0.366 | 1.544 | 56.09 |
| | Sixth Surface | 10.000 | 0.395 | | |
| Fourth lens element | Seventh Surface | −1.595 | 0.275 | 1.544 | 56.09 |
| | Eighth Surface | −0.961 | 0.158 | | |
| Fifth lens element | Ninth Surface | 10.000 | 0.778 | 1.515 | 57.18 |
| | Tenth Surface | 1.187 | 0.208 | | |
| IR Filter | Eleventh Surface | ∞ | 0.15 | 1.515 | 64.17 |
| | Twelfth Surface | ∞ | 0.58 | | |

TABLE 8

Aspheric coefficients of the fourth embodiment

| | Surface# | | | | |
|---|---|---|---|---|---|
| | 1 | 2 | 3 | 4 | 5 |
| k | 0.650 | 20.286 | −1137.435 | −15.762 | −3.264 |
| A | −0.0503 | 0.1005 | 0.1320 | 0.1722 | −0.1449 |
| B | −0.0124 | −0.1433 | −0.0580 | 0.0129 | 0.0464 |
| C | −0.1079 | −0.0826 | −0.0935 | −0.0873 | −0.0281 |
| D | 0.0583 | 0.0490 | −0.0393 | 0.0530 | 0.0350 |
| E | 0.0036 | 0.0098 | 0.2062 | 0.0667 | 0.0856 |
| F | −0.1807 | 0.0517 | 0.0540 | −0.0489 | 0.0117 |
| G | 0.0944 | −0.0593 | −0.1222 | 0.0000 | −0.0465 |
| H | 0.0000 | 0.0000 | 0.0000 | 0.0000 | 0.0000 |
| J | 0.0000 | 0.0000 | 0.0000 | 0.0000 | 0.0000 |

| | Surface# | | | | |
|---|---|---|---|---|---|
| | 6 | 7 | 8 | 9 | 10 |
| k | 46.426 | 0.828 | −1.448 | −833.845 | −8.025 |
| A | −0.0687 | 0.3264 | 0.2214 | −2.2690 | −3.7319 |
| B | −0.0952 | −0.1193 | −0.0354 | 4.3334 | 9.0005 |
| C | −0.0149 | 0.0008 | −0.0024 | −19.4684 | −16.8701 |
| D | 0.0156 | −0.0480 | −0.0025 | 66.3430 | 1.8713 |
| E | 0.0172 | 0.0128 | 0.0001 | −102.9246 | 44.6262 |
| F | 0.0142 | 0.0327 | 0.0006 | 73.8599 | −71.5895 |
| G | 0.0229 | −0.0114 | −0.0002 | −20.2606 | 35.5852 |
| H | 0.0000 | 0.0000 | 0.0000 | 0.0000 | 0.0000 |
| J | 0.0000 | 0.0000 | 0.0000 | 0.0000 | 0.0000 |

Figure 5B:
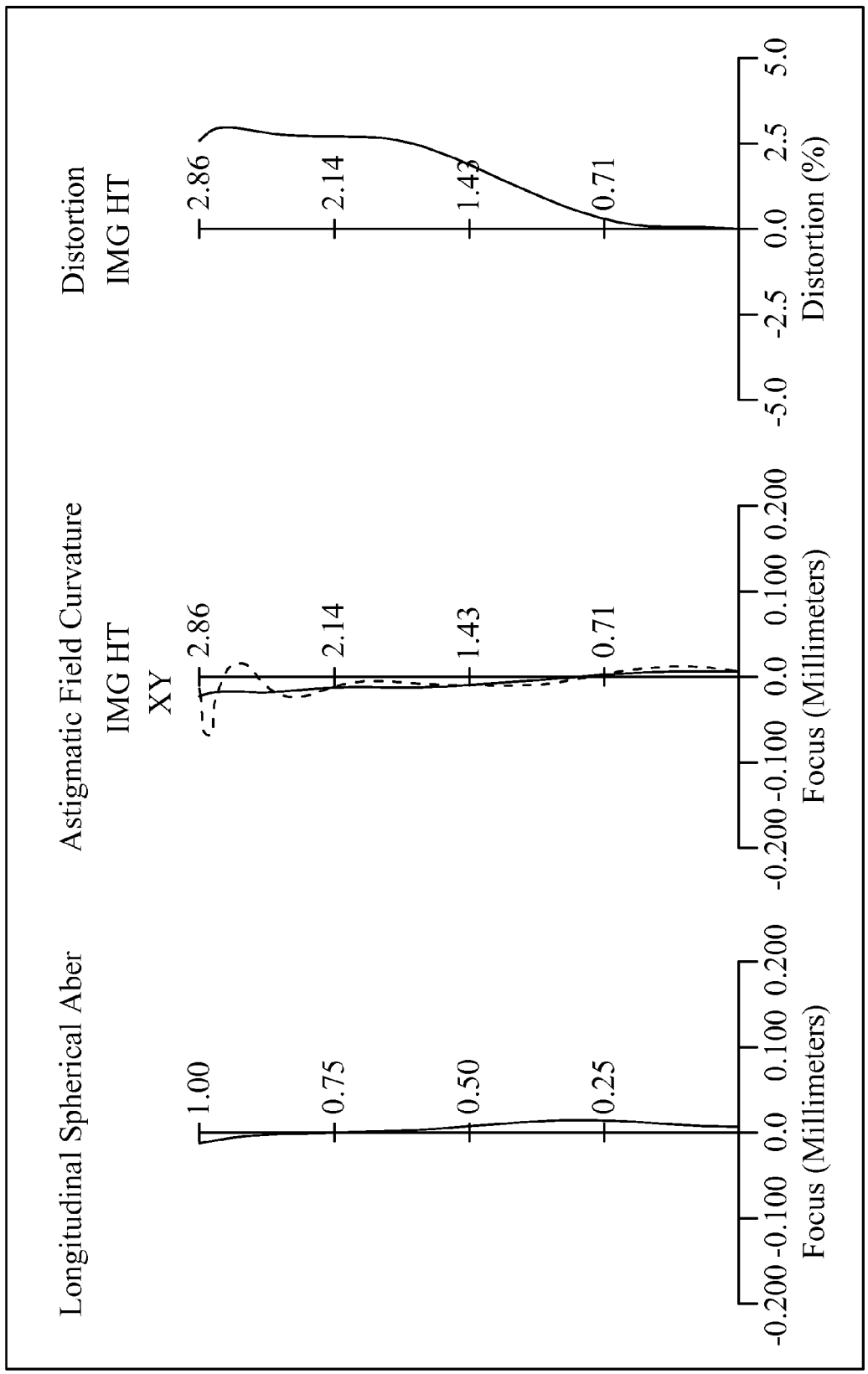
FIG. 5B is astigmatic field curves, a distortion curve and longitudinal spherical aberration curves of the fourth embodiment according to the present invention.

It can be found from the basic lens element data of table 7 along with the curve diagram of aberration of FIG. 5B that it has better compensation effect upon the astigmatic field curves, the distortion curves and the longitudinal spherical aberration curves by the embodiment of the five-piece lens set for capturing images according to the present disclosure.

Figure 6A:
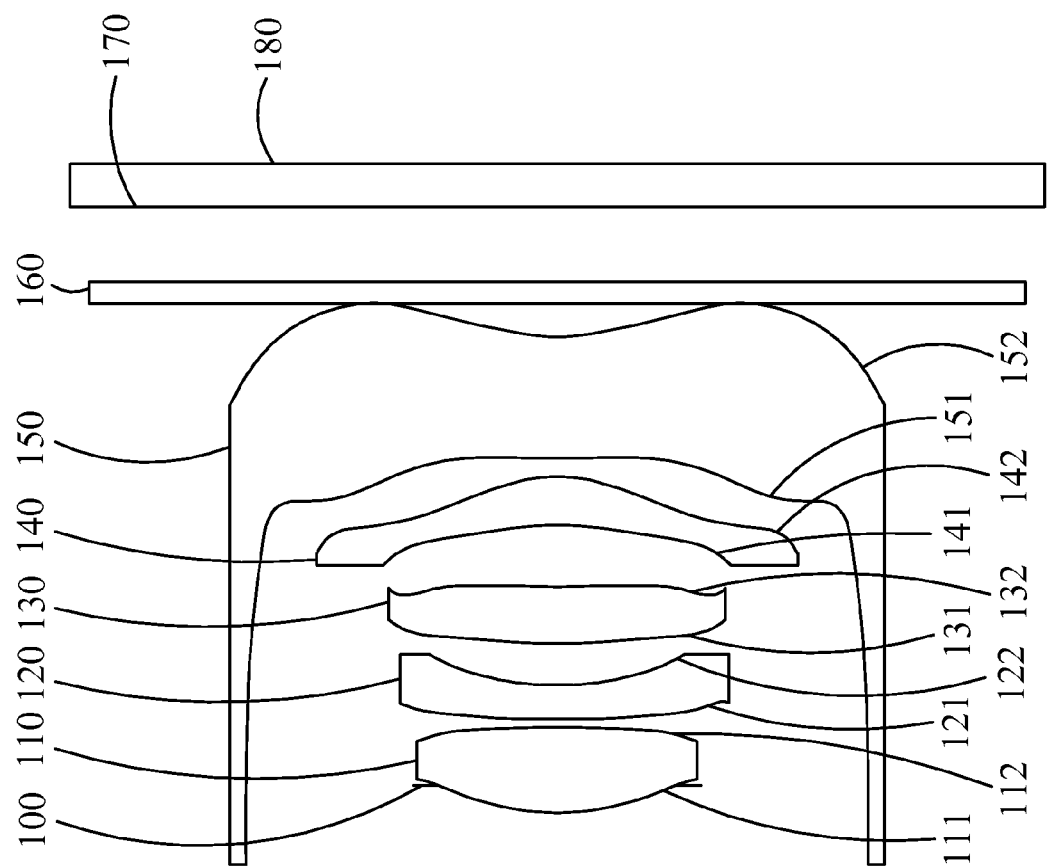
FIG. 6A is a schematic diagram of the fifth embodiment of a s five-piece lens set for capturing images according to the present invention.

Please refer to FIG. 6A which is a schematic diagram of the fifth embodiment according to the present invention. As FIG. 6A shows, the lens structure of the fifth embodiment is akin to that of the first embodiment, and the difference is shown as the optical statistic of Table 9, wherein the all of the object-side and the image-side surfaces of the first 110 to the fifth 150 lens elements are consisted of the aspheric formulas (1), and the aspheric coefficients are shown in Table 10.

Wherein a focal length of five-piece optical lens for capturing images is f=2.631 mm, a distance from the image-plane nearest the image-side surface of the fifth lens element to the optical axis is Ysagm=0.932 mm, a central thickness of the third lens element is ct3=0.295 mm, a central thickness of the fourth lens element is ct4=0.258 mm, a central thickness of the fifth lens element is ct5=0.660 mm, a curvature radius of the object-side surface of the first lens element near the optical axis is R1=1.352 mm, a height from a second inflection point of the object-side surface of the fifth lens element to the optical axis is Yift2=0.856 mm, the second inflection point is one of which is farther than the optical axis in the fifth lens element 150, a distance from the center of the object-side surface 152 of the fifth lens element 150 and the second inflection point 202 perpendicular to a point of the optical axis is Sag=0.108 mm, a distance from the object-side surface of the first lens element to the image-plane on the optical axis is TL=3.35 mm, a distance from the image-side surface of the first lens element to the object-side optical of the second lens element is T12=0.04 mm and a distance from the image-side surface of the fourth lens element to the object-side optical of the fifth lens element is T45=0.09 mm; TL/Ysagm=3.594, ct5/R1=0.488, Yift2/Sag=7.926, Yift/Ysagm=0.918, T12/ct4=0.155, vd1 −vd2=32.2, R1/ct3=4.59, ct5/T45=7.333, ct5/f=0.251 and T45/T12=2.25.

TABLE 9

Basic lens element data of the fifth embodiment

| Surface# | | Curvature radius (mm) | Thickness (mm) | Index (Nd) | Abbe# (Vd) |
|---|---|---|---|---|---|
| Aperture Stop | | ∞ | −0.140 | | |
| First lens element | First Surface | 1.352 | 0.424 | 1.544 | 56.09 |
| | Second Surface | −3.882 | 0.040 | | |
| Second lens element | Third Surface | 6.294 | 0.180 | 1.636 | 23.89 |
| | Fourth Surface | 1.297 | 0.248 | | |
| Third lens element | Fifth Surface | 2.658 | 0.295 | 1.544 | 56.09 |
| | Sixth Surface | 6.529 | 0.292 | | |
| Fourth lens element | Seventh Surface | −1.635 | 0.258 | 1.544 | 56.09 |
| | Eighth Surface | −0.880 | 0.090 | | |
| Fifth lens element | Ninth Surface | 6.797 | 0.660 | 1.515 | 57.18 |
| | Tenth Surface | 1.159 | 0.143 | | |
| IR Filter | Eleventh Surface | ∞ | 0.15 | 1.517 | 64.17 |
| | Twelfth Surface | ∞ | 0.57 | | |

TABLE 10

Aspheric coefficients of the fifth embodiment

| | Surface# | | | | |
|---|---|---|---|---|---|
| | 1 | 2 | 3 | 4 | 5 |
| k | 0.678 | 11.620 | −741.366 | −12.953 | −3.439 |
| A | −0.1074 | 0.2675 | 0.297 | 0.3218 | −0.2863 |

TABLE 10-continued

Aspheric coefficients of the fifth embodiment

| | | | | | |
|---|---|---|---|---|---|
| B | 0.0097 | −0.4072 | −0.1520 | 0.0679 | 0.1255 |
| C | −0.5137 | −0.4756 | −0.5085 | −0.4567 | −0.1807 |
| D | 0.3732 | 0.3316 | −0.4424 | 0.2162 | 0.2145 |
| E | 0.0979 | 0.2843 | 2.4127 | 0.7455 | 1.0057 |
| F | −2.8043 | 1.0092 | 0.9525 | 0.0897 | 0.2807 |
| G | 2.6822 | −1.5058 | −3.2179 | −1.1552 | −1.3222 |
| H | 0.0000 | 0.0000 | 0.0000 | 0.0000 | 0.0000 |
| J | 0.0000 | 0.0000 | 0.0000 | 0.0000 | 0.0000 |

| | Surface# | | | | |
|---|---|---|---|---|---|
| | 6 | 7 | 8 | 9 | 10 |
| k | 22.688 | 1.663 | −1.188 | −833.845 | −8.102 |
| A | −0.1257 | 0.5606 | 0.4055 | −1.2406 | −2.5662 |
| B | −0.3249 | −0.3060 | −0.1186 | 0.7764 | 3.3484 |
| C | −0.0583 | −0.0082 | −0.0076 | −21.9977 | −5.9370 |
| D | 0.0910 | −0.4210 | −0.0116 | 104.1266 | −0.9123 |
| E | 0.1100 | 0.1254 | 0.0147 | −183.7099 | 26.8508 |
| F | 0.14338 | 0.6044 | 0.0112 | 145.3905 | −46.4387 |
| G | 0.6326 | −0.3547 | −0.0112 | −43.7443 | 24.6744 |
| H | 0.0000 | 0.0000 | 0.0000 | 0.0000 | 0.0000 |
| J | 0.0000 | 0.0000 | 0.0000 | 0.0000 | 0.0000 |

Figure 6B:
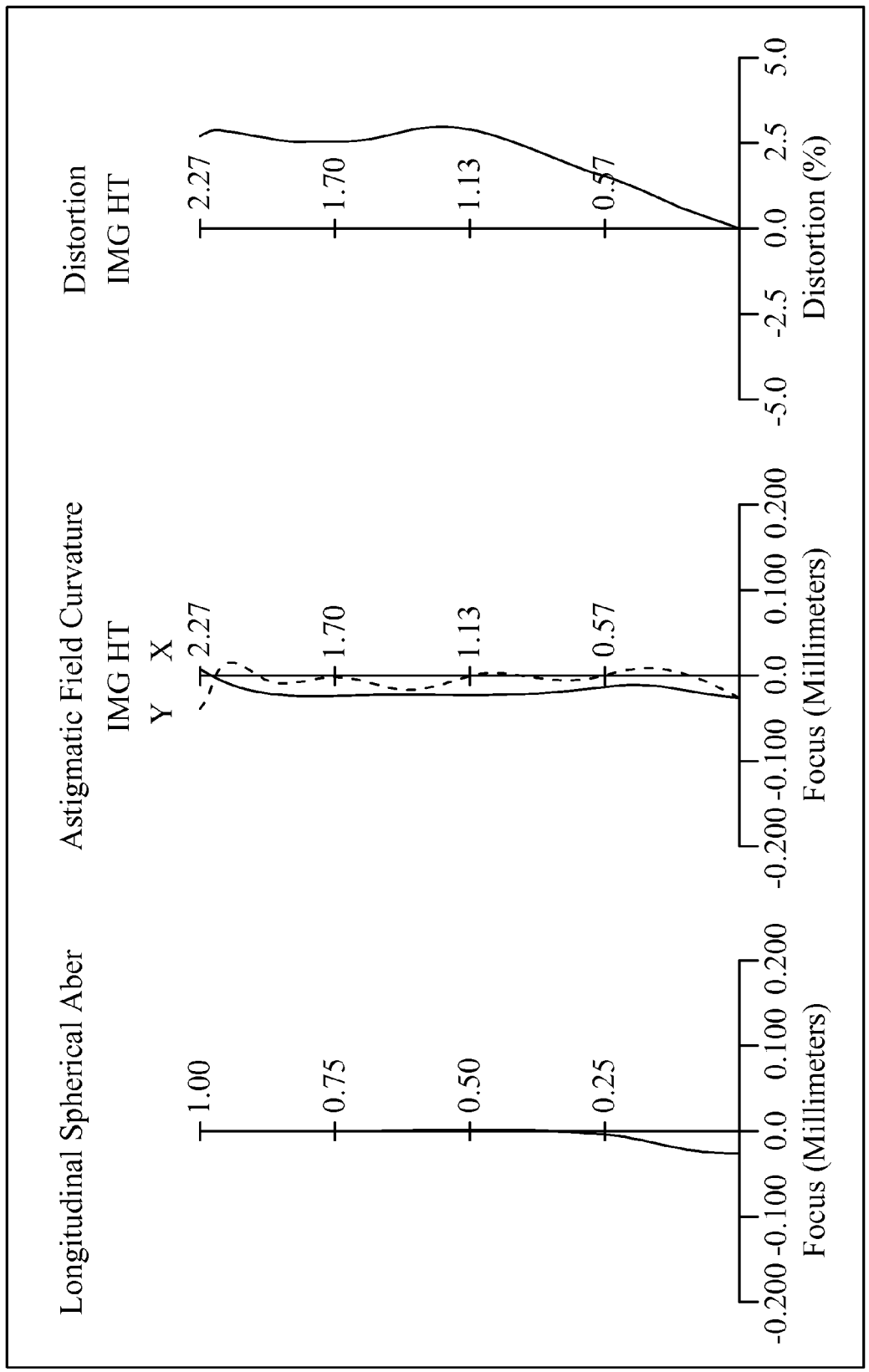
FIG. 6B is astigmatic field curves, a distortion curve and longitudinal spherical aberration curves of the fifth embodiment according to the present invention.

It can be found from the basic lens element data of table 9 along with the curve diagram of aberration of FIG. 6B that it has better compensation effect upon the astigmatic field curves, the distortion curves and the longitudinal spherical aberration curves by the embodiment of the five-piece lens set for capturing images according to the present disclosure.

Figure 7A:
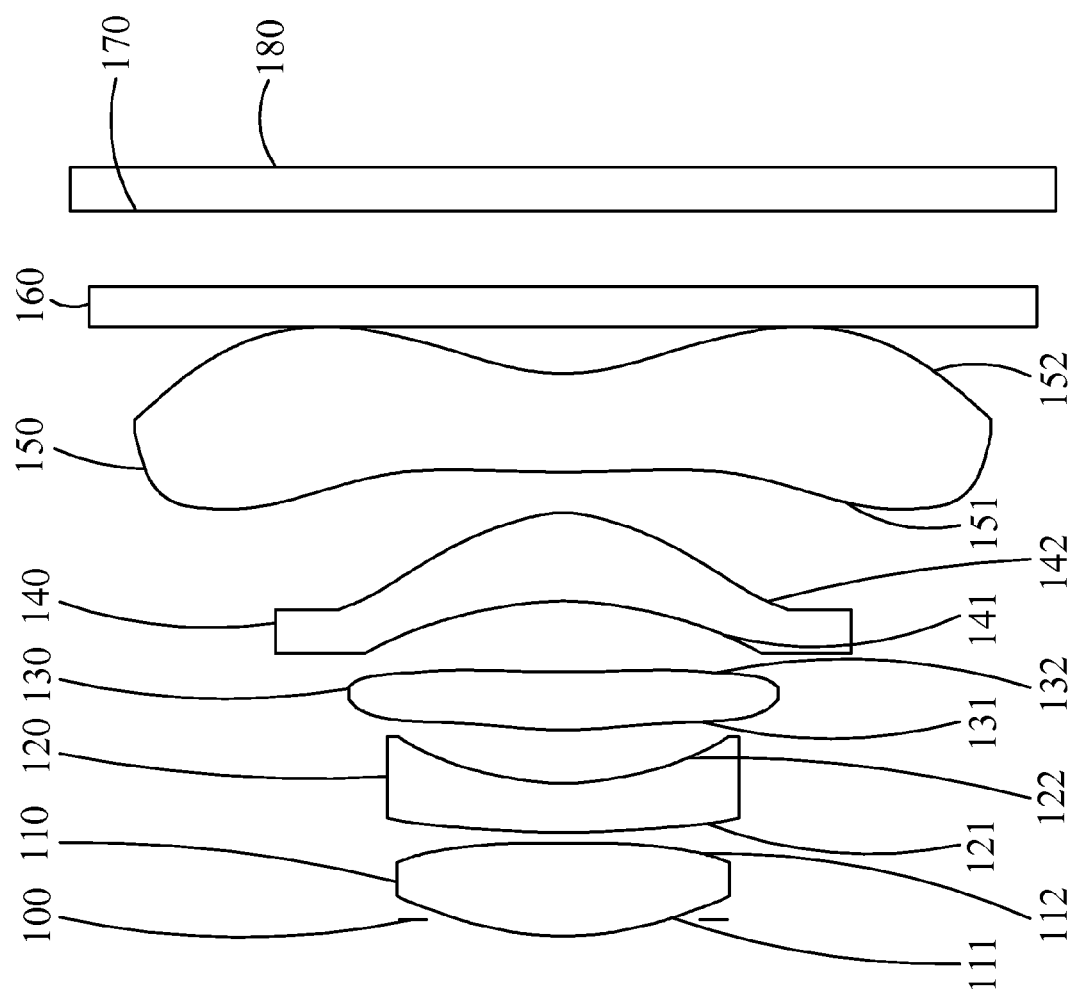
FIG. 7A is a schematic diagram of the sixth embodiment of a s five-piece lens set for capturing images according to the present invention.

Please refer to FIG. 7A which is a schematic diagram of the sixth embodiment according to the present invention. As FIG. 7A shows, the lens structure of the sixth embodiment is akin to that of the first embodiment, and the difference is shown as the optical statistic of Table 11, wherein the all of the object-side and the image-side surfaces of the first 110 to the fifth 150 lens elements are consisted of the aspheric formulas (1), and the aspheric coefficients are shown in Table 12.

Wherein a focal length of five-piece optical lens for capturing images is f=3.138 mm, a distance from the image-plane nearest the image-side surface of the fifth lens element to the optical axis is Ysagm=1.237 mm, a central thickness of the third lens element is ct3=0.307 mm, a central thickness of the fourth lens element is ct4=0.462 mm, a central thickness of the fifth lens element is ct5=0.524 mm, a curvature radius of the object-side surface of the first lens element near the optical axis is R1=1.610 mm, a height from a second inflection point of the object-side surface of the fifth lens element to the optical axis is Yift2=1.139 mm, the second inflection point is one of which is farther than the optical axis in the fifth lens element 150, a distance from the center of the object-side surface 152 of the fifth lens element 150 and the second inflection point 202 perpendicular to a point of the optical axis is Sag=0.063 mm, a distance from the object-side surface of the first lens element to the image-plane on the optical axis is TL=3.986 mm, a distance from the image-side surface of the first lens element to the object-side optical of the second lens element is T12=0.05 mm and a distance from the image-side surface of the fourth lens element to the object-side optical of the fifth lens element is T45=0.22 mm; TL/Ysagm=3.222, ct5/R1=0.325, Yift2/Sag=18.079, Yift/Ysagm=0.921, T12/ct4=0.123, vd1−vd2=32.82, R1/ct3=5.253, ct5/T45=2.382, ct5/f=0.167 and T45/T12=3.884.

TABLE 11

Basic lens element data of the sixth embodiment
Basic lens element data of the sixth embodiment

| Surface# | | Curvature radius (mm) | Thickness (mm) | Index (Nd) | Abbe# (Vd) |
|---|---|---|---|---|---|
| | Aperture Stop | ∞ | −0.090 | | |
| First lens element | First Surface | 1.610 | 0.493 | 1.535 | 56.09 |
| | Second Surface | −9.819 | 0.057 | | |
| Second lens element | Third Surface | 3.213 | 0.260 | 1.640 | 23.27 |
| | Fourth Surface | 1.308 | 0.283 | | |
| Third lens element | Fifth Surface | 2.943 | 0.307 | 1.535 | 56.09 |
| | Sixth Surface | 8.809 | 0.374 | | |
| Fourth lens element | Seventh Surface | −1.645 | 0.462 | 1.535 | 56.09 |
| | Eighth Surface | −0.817 | 0.220 | | |
| Fifth lens element | Ninth Surface | 6.317 | 0.524 | 1.535 | 56.09 |
| | Tenth Surface | 0.995 | 0.248 | | |
| IR Filter | Eleventh Surface | ∞ | 0.21 | 1.517 | 64.17 |
| | Twelfth Surface | ∞ | 0.55 | | |

TABLE 12

Aspheric coefficients of the sixth embodiment

| | Surface# | | | | |
|---|---|---|---|---|---|
| | 1 | 2 | 3 | 4 | 5 |
| k | −7.999 | 6.413 | −110.909 | −11.666 | −7.402 |
| A | 0.2239 | −0.2729 | −0.2387 | 0.0479 | −0.1715 |
| B | −0.3521 | 1.0556 | 0.9912 | 0.2593 | −0.1328 |
| C | 0.5655 | −2.3546 | −1.5469 | −0.1073 | 0.3746 |
| D | −1.2944 | 2.2743 | 0.5862 | −0.7158 | 0.0338 |
| E | 2.5059 | −0.7701 | 0.8441 | 1.5006 | −0.2436 |
| F | −3.4164 | −0.2240 | −0.2674 | −0.9564 | 0.0000 |
| G | 1.1661 | 0.1799 | −0.3957 | 0.0852 | 0.0708 |
| H | 0.0000 | 0.0000 | 0.0000 | 0.0000 | 0.0000 |
| J | 0.0000 | 0.0000 | 0.0000 | 0.0000 | 0.0000 |

| | Surface# | | | | |
|---|---|---|---|---|---|
| | 6 | 7 | 8 | 9 | 10 |
| k | −89.788 | 1.303 | −2.788 | −97.754 | −6.067 |
| A | −0.0396 | 0.1696 | −0.0868 | −0.0791 | −0.0958 |
| B | −0.1679 | 0.0986 | 0.1359 | −0.0265 | 0.0427 |
| C | 0.0384 | −0.5474 | −0.2109 | 0.0269 | −0.0211 |
| D | 0.2892 | 0.9770 | 0.2467 | −0.0037 | 0.0064 |
| E | −0.1932 | −0.7303 | −0.1133 | −0.0006 | −0.0011 |
| F | 0.0000 | 0.2198 | 0.0141 | 0.0001 | 8.7629E−5 |
| G | 0.0020 | 0.0031 | 0.0008 | −1.6795E−6 | −2.0637E−6 |
| H | 0.0000 | 0.0000 | 0.0000 | 0.0000 | 0.0000 |
| J | 0.0000 | 0.0000 | 0.0000 | 0.0000 | 0.0000 |

Figure 7B:
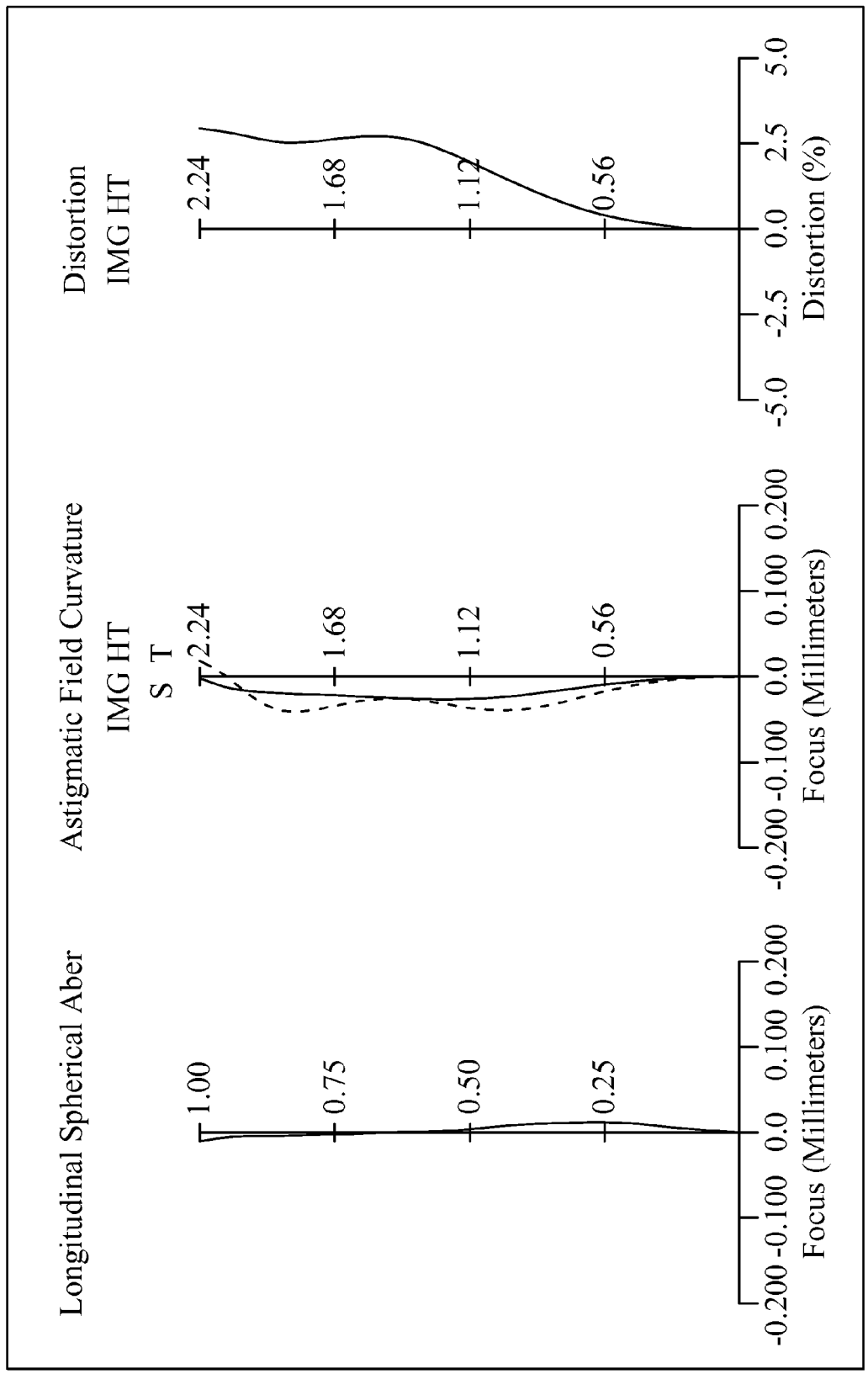
FIG. 7B is astigmatic field curves, a distortion curve and longitudinal spherical aberration curves of the sixth embodiment according to the present invention.

It can be found from the basic lens element data of table 11 along with the curve diagram of aberration of FIG. 7B that it has better compensation effect upon the astigmatic field curves, the distortion curves and the longitudinal spherical aberration curves by the embodiment of the five-piece lens set for capturing images according to the present disclosure.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A five-piece lens set for capturing images, comprising:
   a five-piece optical lens, in order from an object side toward an image side comprising a first lens element with positive refractive power having a convex image-side surface near the optical axis;
   a second lens element having a convex object-side surface near the optical axis, and at least one of the object-side and an image-side surfaces of the second lens element being aspheric;
   a third lens element with positive refractive power having a concave image-side surface, and the image-side surface having one inflection point that is located away from the optical axis;
   a fourth lens element with positive refractive power, and at least one of an object-side and an image-side surfaces of the fourth lens element being aspheric;
   a fifth lens element having a convex object-side surface near the optical axis and the object-side surface having two inflection points that are located away from the optical axis;
   an image-plane for imaging an object to be imaged; and
   an aperture stop disposed between the object and the second lens element;
   wherein a distance from the object-side surface of the first lens element to the image-plane on the optical axis is TL, a distance from the image-plane nearest the image-side surface of the fifth lens element to the optical axis is Ysagm, a central thickness of the fifth lens element is ct5, a curvature radius of the object-side surface of the first lens element near the optical axis is R1, a height from a second inflection point of the object-side surface of the fifth lens element to the optical axis is Yift2, the second inflection point is one of which is farther than the optical axis, a distance from the center of the object-side surface of the fifth lens element and the second inflection point perpendicular to a point of the optical axis is Sag, and the following relationship is satisfied: 2.5<TL/Ysagm<5.0, 0.1<ct5/R1<0.8, 4.0<Yift2/Sag<20.0.

2. The five-piece lens set for capturing images of claim 1, wherein the image-plane is positioned on an image sensor.

3. The five-piece lens set for capturing images of claim 1, wherein an Abbe number of the second lens element is vd2, and the following relationship is satisfied: vd2≤30.

4. The five-piece lens set for capturing images of claim 1, wherein Ysagm and Yift2 are satisfied with the following relationship: 0.5<Yift2/Ysagm<1.3.

5. The five-piece lens set for capturing images of claim 1, wherein the third, fourth and fifth lens elements are all made of plastic material.

6. A five-piece lens set for capturing images, comprising:
   a five-piece optical lens, in order from an object side toward an image side comprising
   a first lens element with positive refractive power having a convex image-side surface near the optical axis;
   a second lens element having a convex object-side surface near the optical axis, and at least one of the object-side and an image-side surfaces of the second lens element being aspheric;
   a third lens element with positive refractive power having a convex object-side surface and a concave image-side surface near the optical axis;
   a fourth lens element having a concave object-side surface near the optical axis;
   a fifth lens element with negative refractive power having a convex object-side surface near the optical axis and the object-side surface having two inflection points that are located away from the optical axis;
   an image-plane for imaging an object to be imaged; and
   an aperture stop disposed between the object and the second lens element;
   wherein a distance from the object-side surface of the first lens element to the image-plane on the optical axis is TL, a distance from the image-side surface of the first lens element to the object-side surface of the second lens element on the optical axis is T12, a distance from the image-plane nearest the image-side surface of the fifth lens element to the optical axis is Ysagm, a central thickness of the fourth lens element is ct4, a height from a second inflection point of the object-side surface of the fifth lens element to the optical axis is Yift2, the second inflection point is one of which is farther than the optical axis, a distance from the center of the object-side surface of the fifth lens element and the second inflection point perpendicular to a point of the optical axis is Sag, and the following relationship is satisfied: 2.5<TL/Ysagm<5.0, 0.05<T12/ct4<0.35, 4.0<Yift2/Sag<20.0.

7. The five-piece lens set for capturing images of claim 6, wherein the image-plane is positioned on an image sensor.

8. The five-piece lens set for capturing images of claim 6, wherein an Abbe number of the first lens element is vd1, an Abbe number of the second lens element is vd2, and the following relationship is satisfied: 25≤vd1−vd2≤35.

9. The five-piece lens set for capturing images of claim 6, wherein a curvature radius of the object-side surface of the first lens element near the optical axis is R1, a central thickness of the third lens element is ct3, and the following relationship is satisfied: 3.5<R1/ct3<6.0.

10. The five-piece lens set for capturing images of claim 6, wherein the fourth and the fifth lens element are made of plastic material, and the image-side surface of the fourth lens element has at least one inflection point.

11. A five-piece lens set for capturing images, comprising:
    an aperture stop;
    a five-piece optical lens, in order from an object side toward an image side comprising
    a first lens element with positive refractive power having a convex image-side surface near the optical axis;
    a second lens element with negative refractive power having a convex object-side surface and a concave image-side surface near the optical axis;
    a third lens element with positive refractive power having a concave image-side surface near the optical axis and the image-side surface having one inflection point that is located away from the optical axis;
    a fourth lens element with positive refractive power having at least one inflection point in the image-side surface;
    a fifth lens element having a convex object-side surface and a concave image-side surface near the optical axis, and the object-side surface having two inflection points that are located away the optical axis;
    an image-plane for imaging an object to be imaged; and
    an aperture stop disposed between the object and the second lens element;
    wherein a distance from the object-side surface of the first lens element to the image-plane on the optical axis is TL, a distance from the image-side surface of the fourth lens element to the object-side surface of the fifth lens element on the optical axis is T45, a distance from the image-plane nearest the image-side surface of the fifth lens element to the optical axis is Ysagm, a central thickness of the fifth lens element is $ct5$, a height from a second inflection point of the object-side of the fifth lens element to the optical axis is $Yift2$, the second inflection point is one of which is farther than the optical axis, a distance from the center of the object-side surface of the fifth lens element and the second inflection point perpendicular to a point of the optical axis is $Sag$, and the following relationship is satisfied: $2.5 < TL/Ysagm < 5$, $2.0 < ct5/T45 < 8.0$, $4.0 < Yift2/Sag < 20.0$.

12. The five-piece lens set for capturing images of claim 11, wherein the image-plane is positioned on an image sensor.

13. The five-piece lens set for capturing images of claim 11, wherein a focal length of the five-piece optical lens is f, and the following relationship is satisfied: $0.1 \leq ct5/f \leq 0.3$.

14. The five-piece lens set for capturing images of claim 11, wherein a distance from the image-side surface of the first lens element to the object-side surface of the second lens element on the optical axis is $T12$, and the following relationship is satisfied: $1.7 < T45/T12 < 4.5$.

15. The five-piece lens set for capturing images of claim 11, wherein the object-side and the image-side surfaces of the second lens element are aspheric, the fifth lens element is made of plastic material and the object-side and the image-side surfaces of the fifth lens element are aspheric.

* * * * *